US007797294B2

(12) United States Patent
Gartner et al.

(10) Patent No.: US 7,797,294 B2
(45) Date of Patent: Sep. 14, 2010

(54) METHOD, SYSTEM AND PROGRAM FOR TESTING ACCESSIBILITY IN DATA PROCESSING SYSTEM PROGRAMS

(75) Inventors: Jason Michael Gartner, Markham (CA); Mark Maurice Mezofenyi, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1392 days.

(21) Appl. No.: 10/926,661

(22) Filed: Aug. 25, 2004

(65) Prior Publication Data

US 2006/0047627 A1 Mar. 2, 2006

(51) Int. Cl.
*G06F 17/30* (2006.01)
(52) U.S. Cl. ...................... 707/705; 707/899
(58) Field of Classification Search ............ 707/1, 707/103 R, 705, 899, 999.001, 999.103
See application file for complete search history.

(56) References Cited

U.S. PATENT DOCUMENTS

| 5,864,865 | A | * | 1/1999 | Lakis .................. 707/103 R |
| 6,360,235 | B1 | | 3/2002 | Tilt et al. ............... 707/501.1 |
| 6,473,794 | B1 | | 10/2002 | Guheen et al. ............ 709/223 |
| 6,505,300 | B2 | * | 1/2003 | Chan et al. ............... 713/164 |
| 6,751,634 | B1 | * | 6/2004 | Judd ....................... 707/200 |
| 7,020,532 | B2 | * | 3/2006 | Johnson et al. ............. 700/89 |
| 7,080,059 | B1 | * | 7/2006 | Poston et al. .............. 707/1 |
| 7,143,025 | B2 | * | 11/2006 | Walsh et al. ............... 703/21 |
| 7,185,364 | B2 | * | 2/2007 | Knouse et al. ............. 726/8 |
| 2004/0034699 | A1 | * | 2/2004 | Gotz et al. ............... 709/223 |
| 2004/0153822 | A1 | * | 8/2004 | Arcand et al. ............. 714/38 |
| 2004/0267694 | A1 | * | 12/2004 | Sakai et al. ............... 707/1 |
| 2005/0246368 | A1 | * | 11/2005 | Yeung et al. ............. 707/102 |

OTHER PUBLICATIONS

Brahosky et al, PennState, Access PSU, Web 2003 Tutorial, *Accessibility Essential for contemporary Web Design*, pp. 1-38.
Chi, et al, *The bloodhound Project: Automating Discovery of Web Usability Issues using the InfoScent Simulator*, Paper: Web Usability, Ft Lauderdale, Florida USA Apr. 5-10, 2003, vol. 5, Issue 1, pp. 505-512.

* cited by examiner

*Primary Examiner*—Don Wong
*Assistant Examiner*—Thanh-Ha Dang
(74) *Attorney, Agent, or Firm*—Sughrue Mion, PLLC

(57) ABSTRACT

Disclosed is a data processing system implemented method, a data processing system and an article of manufacture for testing accessibility of a data processing system program according to accessibility criteria. The data processing system program includes a plurality of objects, at least one object of the plurality of objects usable as a user interface between the data processing system program and a user. The data processing system implemented method includes identifying the at least one object of the data processing system program pertaining to the user interface, determining if the identified at least one object satisfies the accessibility criteria by examining an accessibility description for the identified at least one object, and producing an indication that the identified at least one object does not satisfy the accessibility criteria if the identified object does not contain an accessibility description.

30 Claims, 6 Drawing Sheets

METHOD, SYSTEM AND PROGRAM FOR TESTING ACCESSIBILITY IN DATA PROCESSING SYSTEM PROGRAMS

FIELD OF THE INVENTION

The present invention relates to the field of accessability testing for data processing system program programs, and more specifically to a data processing system implemented method, a data processing system and an article of manufacture for testing accessibility in data processing system programs.

BACKGROUND OF THE INVENTION

Software programs are being developed to take into consideration accessibility to the program for all individuals regardless of any disabilities. To provide a standard against which accessibility can be determined, accessibility checklists containing accessibility standards have been created. The accessibility of a software program is tested against these accessibility checklists. In the case of Java-based software programs this testing is often performed by a manual process using standard accessibility programs.

SUMMARY OF THE INVENTION

In accordance with an aspect of the present invention there is provided a data processing system implemented method of testing accessibility of a data processing system program according to accessibility criteria, the data processing system program comprising a plurality of objects, at least one object of the plurality of objects usable as a user interface between the data processing system program and a user, the data processing system implemented method including identifying the at least one object of the data processing system program pertaining to the user interface, determining if the identified at least one object satisfies the accessibility criteria by examining an accessibility description for the identified at least one object, and producing an indication that the identified at least one object does not satisfy the accessibility criteria if the identified object does not contain an accessibility description.

In accordance with an aspect of the present invention there is provided a data processing system for testing accessibility of a data processing system program according to accessibility criteria, the data processing system program comprising a plurality of objects, at least one object of the plurality of objects usable as a user interface between the data processing system program and a user, the data processing system including an identifier for identifying the at least one object of the data processing system program pertaining to the user interface a determinator for determining if the identified at least one object satisfies the accessibility criteria by examining an accessibility description for the identified at least one object, and a producer for producing an indication that the identified at least one object does not satisfy the accessibility criteria if the identified object does not contain an accessibility description.

In accordance with an aspect of the present invention there is provided an article of manufacture for testing accessibility of a data processing system program according to accessibility criteria, the data processing system program comprising a plurality of objects, at least one object of the plurality of objects usable as a user interface between the data processing system program and a user, the article of manufacture including a data processing system usable medium adapted to tangibly embody data processing system executable code including data processing system executable code for identifying the at least one object of the data processing system program pertaining to the user interface, data processing system executable code for determining if the identified at least one object satisfies the accessibility criteria by examining an accessibility description for the identified at least one object, and data processing system executable code for producing an indication that the identified at least one object does not satisfy the accessibility criteria if the identified object does not contain an accessibility description.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be described in conjunction with the drawings in which.

DETAILED DESCRIPTION OF EMBODIMENTS

The following detailed description of the embodiments does not limit the implementation of the embodiments to any particular computer programming language. The computer program product may be implemented in any computer programming language provided that the operating system provides the facilities that support the requirements of the computer program product. A preferred embodiment is implemented in the C or C++ computer programming language (or may be implemented in other computer programming languages in conjunction with C/C++). Any limitations presented would be a result of a particular type of operating system, computer programming language, or data processing system and would not be a limitation of the embodiments described herein.

A Java-based program may be tested for accessibility according to accessibility criteria. The Java-based program comprises a plurality of objects, at least one of which pertains to a user interface therefor. The at least one object in the program pertaining to the user interface is identified. It is then determined if the identified object satisfies the accessibility criteria by examining an accessibility description for the identified object. The identified object does not satisfy the accessibility criteria when the identified object does not contain an accessibility description. If the identified object does not satisfy the accessibility criteria then an indication is produced that this occurred.

Figure 1:
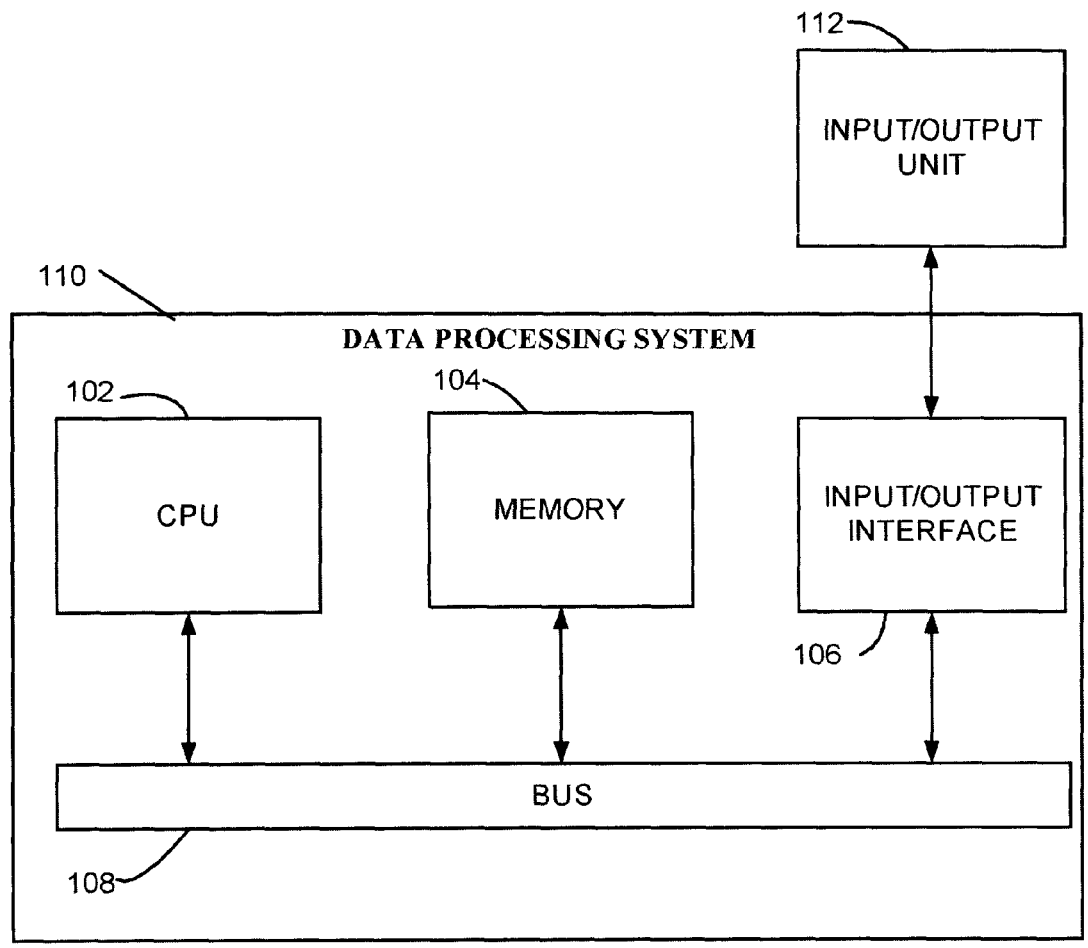
FIG. 1 is an exemplary computing environment in which the present invention may be implemented.

FIG. 1 illustrates a configuration of a computing environment 100 in which the present invention may be implemented.

A data processing system 110 in the computing environment 100 includes a central processing unit (CPU) 102, a memory 104, an input/output interface 106 and a bus 108. The CPU 102, the memory 104 and the input/output interface 106 are connected with one another via the bus 108. The input/output interface 106 is configured so that it can be connected to an input/output unit 112.

The present invention may be embodied in a program stored in, for example, the memory 104. Alternatively, the present invention may be recorded on any type of recording medium such as a magnetic disk or an optical disk. The present invention recorded on such a recording medium is loaded to the memory 104 of the computing environment 100 via the input/output unit 112 (e.g. a disk drive).

The CPU 102 can be a commercially available CPU or a customized CPU suitable for operations described herein. Other variations of CPU 102 can include a plurality of CPUs interconnected to coordinate various operations and functions. The computing environment 100 serves as an apparatus for performing the present method by the CPU 102 executing the present invention.

Figure 2A:
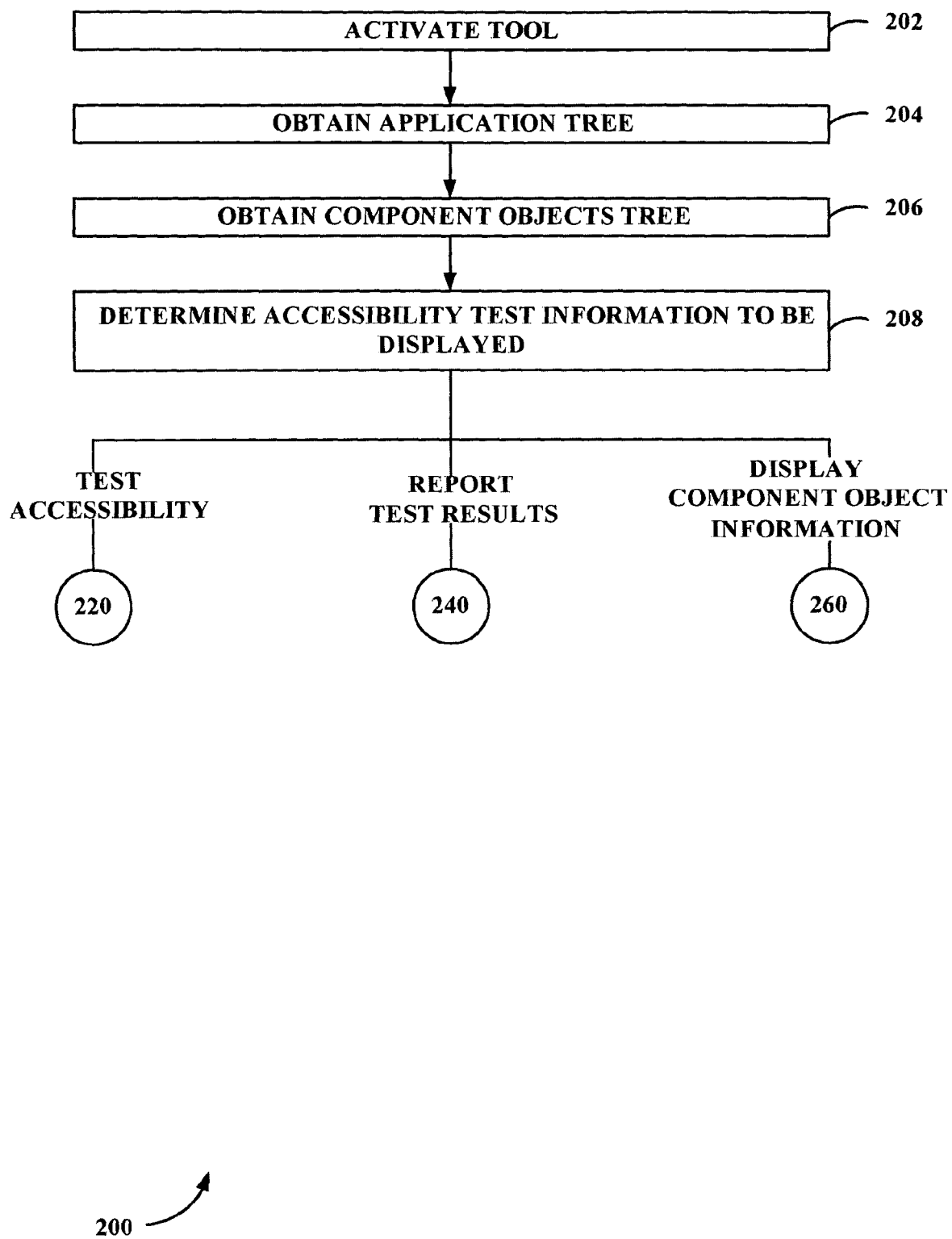
FIG. 2A illustrates operations a tool for accessibility testing for a Java-based program operating in the computing environment of FIG. 1.

FIG. 2A illustrates operations 200 of a tool for accessibility testing for a Java-based program operating in the computing environment of FIG. 1. The Java-based program may be stored in the memory 104 and processed by the CPU 102 during execution thereof. A user interface for the Java-based program with which a user may interact may be presented on the input/output unit 112 through the input/output interface 106. The Java-based program also includes various interfaces through which external programs may interact therewith. These interfaces enable accessible programs to communicate and function with the Java-based programs. It is through these interfaces and the incorporation of the external programs that the Java-based program is made accessible. Since it is the accessibility interfaces of the Java-based program that enable the accessibility features, it is through these interfaces that a user interface presenting the accessible program is tested to determine whether the Java-based program can be considered to be accessible based on accessibility checklists.

The Java-based program comprises multiple objects that are instances of classes that may be related to each other through inheritance of classes or use of variables or functions from other classes. The classes on which the objects are based include classes that are used to create various components of the user interface (e.g. button, scroll bar, etc.). The accessibility interfaces in the Java-based program interact with these component classes to enable the external program to interact with various parts of the user interface.

Relationships between objects may be represented by a tree where each leaf or node of the tree represents an object and the branches represent the manner in which the objects are related. A tree can be used to represent the relationships between all of the objects in the Java-based program or only the component objects.

The tool is activated in step 202 when the Java-based program is started. The tree for all of the objects in the program is obtained in step 204. The program tree may be obtained by the tool from the program, perhaps from an environment that is executing the Java-based program. The tree for the component classes is obtained in step 206. The component classes tree may also be obtained by the tool from the program.

The accessibility information that is to be displayed is determined in step 208. The accessibility information that is to be displayed may be selected by a user and may include performing testing of the accessibility of the object of the component classes and providing an indication of those objects that don't meet the standards; providing a summary of the test results; and displaying general relationship information for a component object.

Figure 2B:
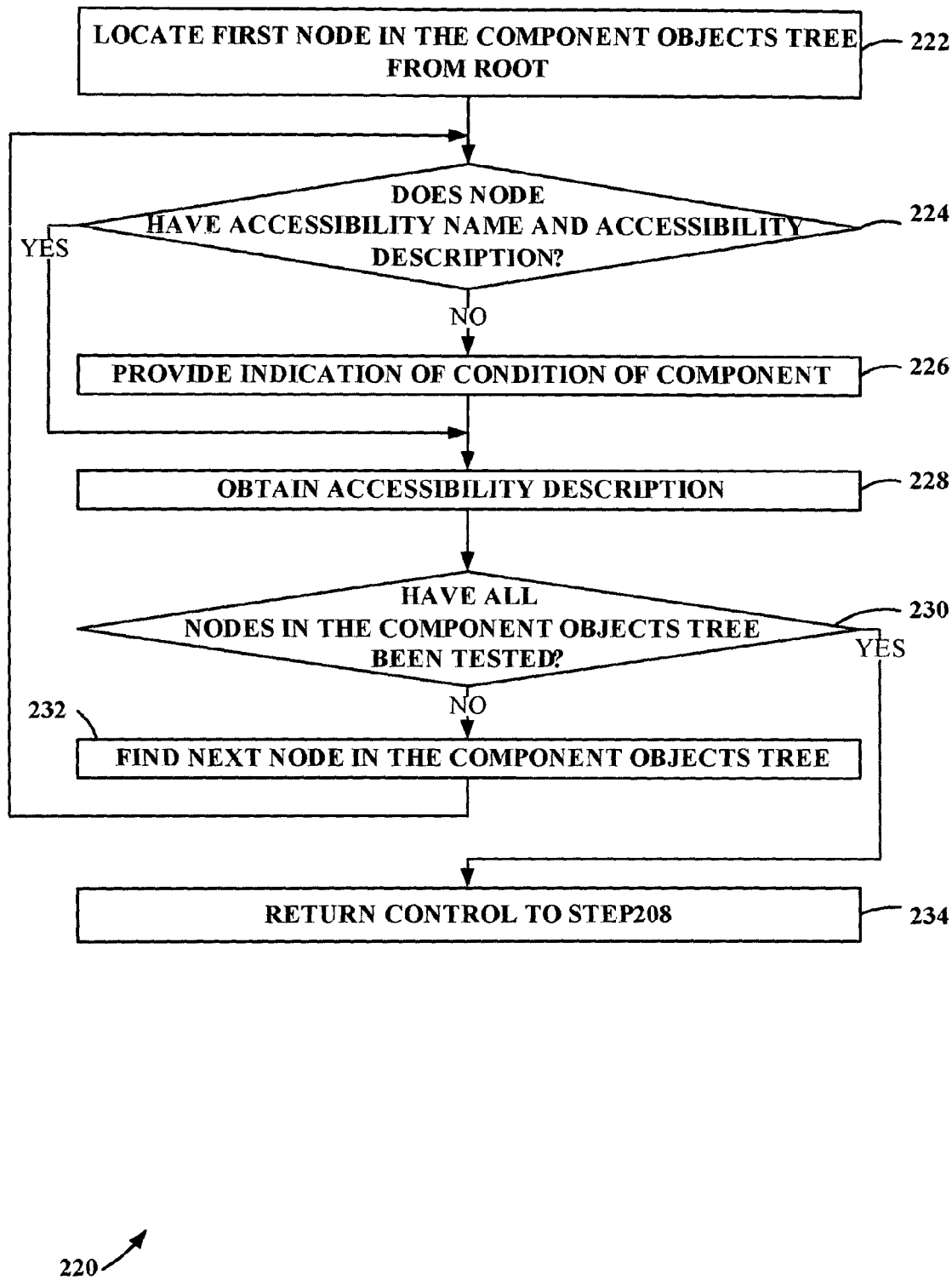
FIG. 2B is a flow diagram illustrating accessibility testing of the tool of FIG. 2A.
Figure 2C:
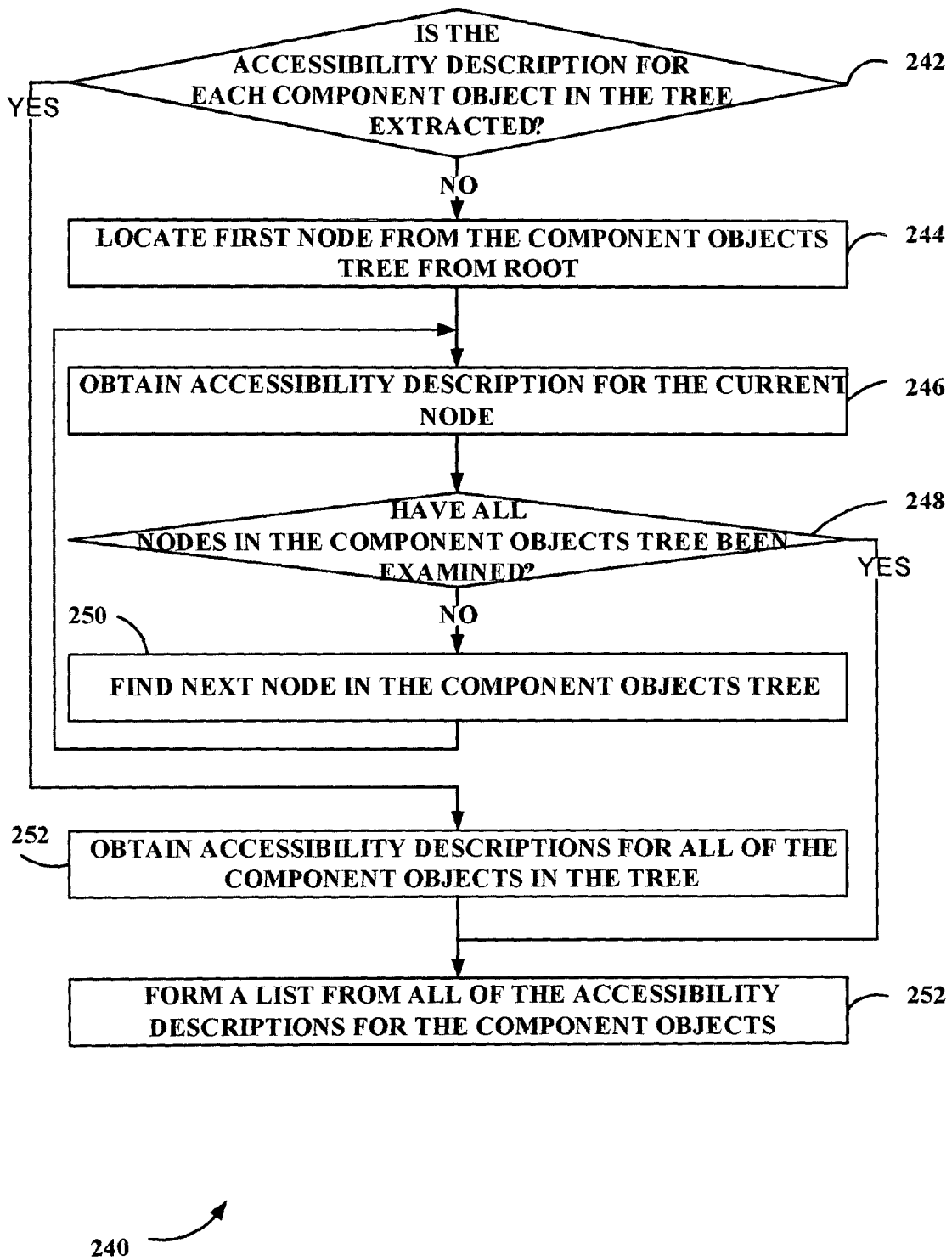
FIG. 2C is a flow diagram illustrating accessibility test reporting of the tool of FIG. 2A.
Figure 2D:
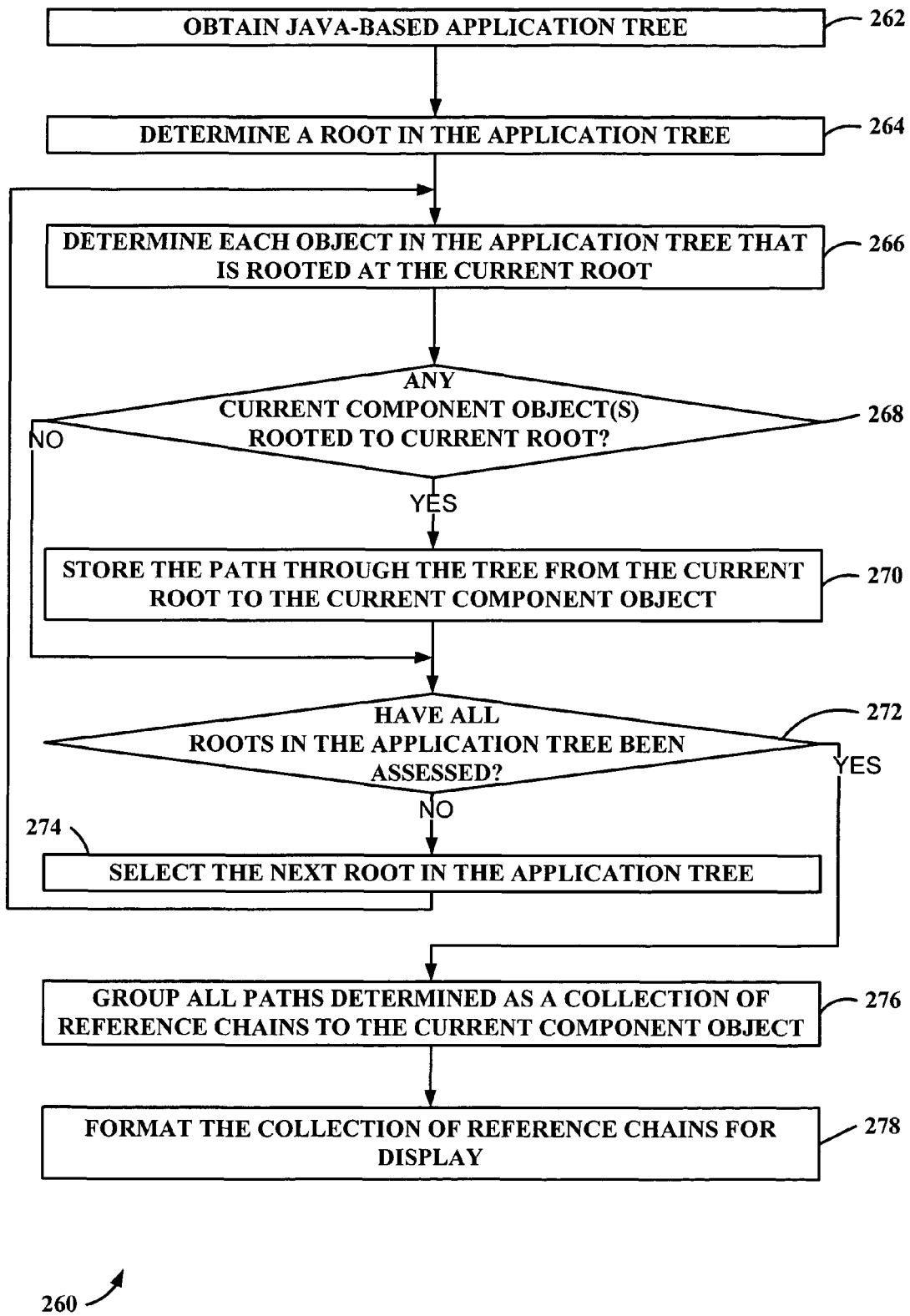
FIG. 2D is a flow diagram illustrating class information displaying by the tool of FIG. 2A.

If the Java-based program is to be tested for accessibility then the method in FIG. 2B is performed. If a summary of the accessibility test results is to be displayed then the method in FIG. 2C is performed. If information of the relationship of a particular component object with respect to other component objects in the program is to be displayed then the method in FIG. 2D is performed.

FIG. 2B illustrates a method 220 of testing the accessibility of a component object in the Java-based program. All of the component objects in the Java-based program are related. These relationships may be illustrated by a tree composed only of the component objects. The component objects tree is traversed in the method 220 to test the accessibility of each component object therein. In the present case, accessibility of the Java-based program is determined on the basis of the component objects used therein. Each component object should contain an accessible name and an accessible description. The accessible name and the accessible description are used as a measure for accessibility.

The first node from the root in the component object tree is located in step 222.

The component object associated with the current node is then examined in step 224 to determine if the component object includes an accessibility name and an accessibility description. If this is the first time that step 224 has been performed during the current execution of the method 220 then the current node is the first node located in step 222, otherwise the current node is the node in the component objects tree that was most recently located. The presence of the accessibility name and the accessibility description determines whether or not the component object is considered to be accessible.

If the component object does not include an accessibility name and an accessibility description then an indication that the component object does not meet accessibility criteria is provided in step 226. This indication may include providing a visual indication to the user that the component object of the current node does not meet accessibility criteria. After the indication is shown, or if the component object has an accessibility name and an accessibility description, then the accessibility description is obtained in step 228 and put aside for later use. Step 228 may be performed to gather information in anticipation of reporting accessibility information and accessibility test results for the Java-based program. Step 228 may not be performed if the testing time for the program is of consideration.

After step 228 the testing of the current node has been completed. In step 230 it is determined if there are any nodes in the component objects tree that have not been tested. If there are untested nodes then the next node in the component objects tree is determined in step 232. After the next node is found steps 224 to 230 are repeated with this node. This cycle continues until all of the nodes in the component objects tree have been tested.

After it is determined in step 230 that all of the nodes in the component objects tree have been tested then control flow returns to the method 200 in FIG. 2A in step 234.

FIG. 2C illustrates a method 240 for reporting the results of accessibility testing of the Java-based program performed in the method 220. It is determined in step 242 if the accessibility description for each component object has already been extracted. This may be performed by examining a data storage where a copy of accessibility description may have been deposited by the method 220.

If the accessibility description for each component object has not been extracted then the first node from the root in the component objects tree is located in step 244. The component objects tree is traversed in steps 246 to 250 to obtain the accessibility descriptions. The accessibility description is obtained from the component object of the current node in step 246 and retained with other accessibility description. In step 248 it is determined whether or not all nodes in the component objects tree have been examined to obtain the accessibility description. If not all nodes have been examined then the next node is found in step 250 and steps 246 and 248 are repeated with the new node.

If the accessibility descriptions have already been retained for the component objects (as determined in step 242) then these accessibility descriptions are obtained in step 252 from storage. After all accessibility descriptions have been obtained (either from storage or the traversal of all nodes in the component objects tree in step 248) then a list of all of the accessibility descriptions is formed for display in step 254.

FIG. 2D illustrates a method 260 for displaying information on a particular component object in the Java-based program. The program tree is obtained in step 262. A root in the program tree is identified in step 264. All objects in the program tree that can be derived back to the current root are determined in step 266. From these objects that are rooted by the current root, the current component objects are identified in step 268. For those objects identified in step 268, the path from the root to the object is determined and stored in step 270. Each of these paths is considered to be a reference chain containing a chain of references for the current component object extending to the root. If no objects were found in step 268 or after the paths are stored in step 270, then it is determined if all roots in the program have been assessed in step 272. If not all roots have been assessed then the next root is selected in step 274 and steps 266 to 272 are repeated with this next root. This process continues until all of the roots in the program tree have been examined.

After all roots in the program tree have been assessed as determined in step 272, all of the paths are grouped in step 276 as a collection of reference chains from each of the roots to the current node. The collection of reference chains is formatted for display in step 278. The name(s) of the other objects referring to the current object, the accessibility description and the component objects tree may also be displayed for the current component object.

Figure 3:
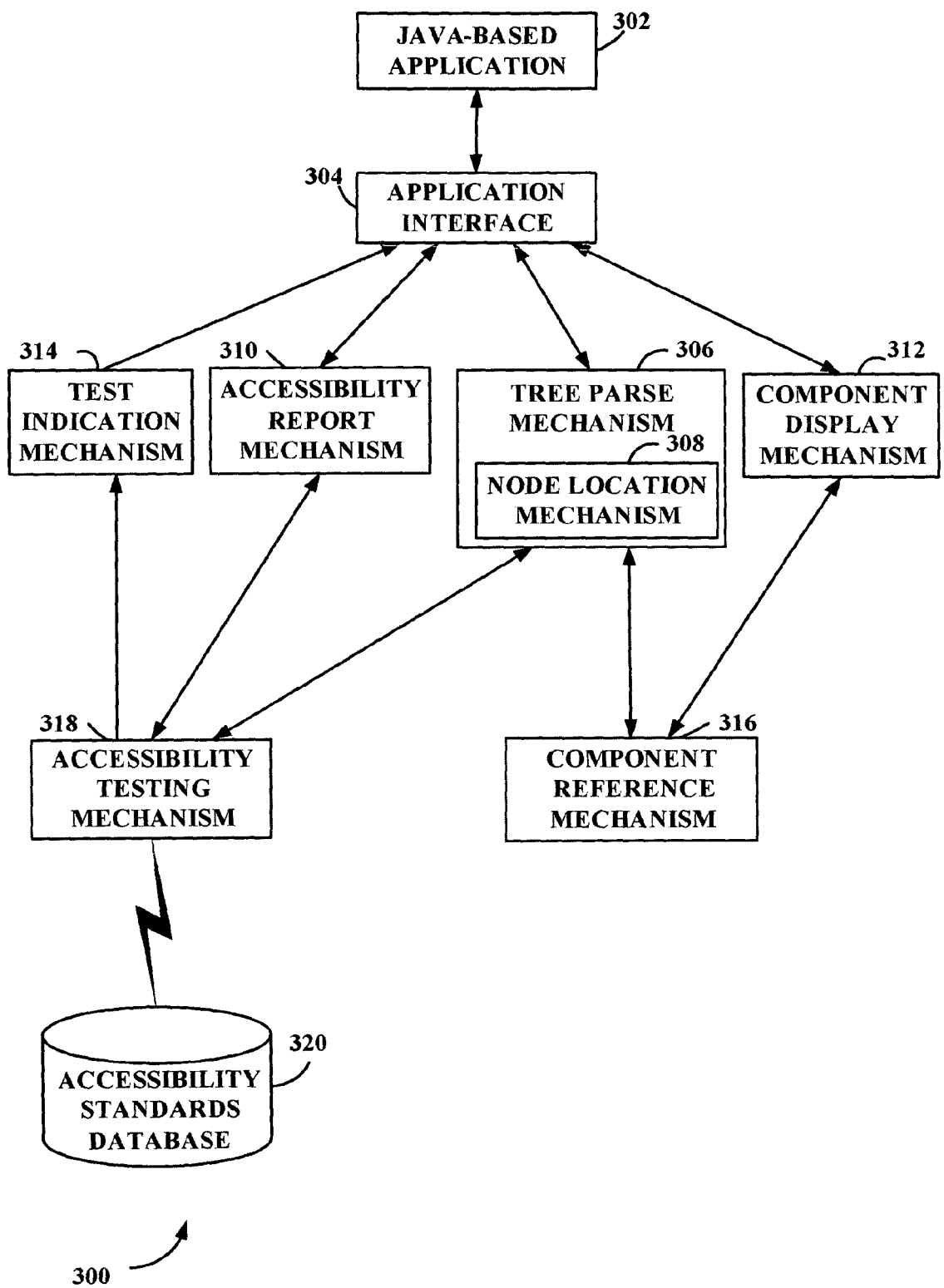
FIG. 3 illustrates functional components of a tool for testing accessibility of a Java-based program operating in the computing environment of FIG. 1.

FIG. 3 illustrates functional components of a tool 300 for testing accessibility of a Java-based program 302 operating in the computing environment of FIG. 1. The tool 300 has an program interface 304 for communication with the Java-based program 302. The program interface 304 obtains information from the Java-based program 302 on the classes and objects from which the Java-based program 302 is composed.

The program interface 304 communicates with a tree parse mechanism 306, an accessibility report mechanism 310, a component display mechanism 312 and a test indication mechanism 314. The tree parse mechanism 306 has a node location mechanism 308 to assist the tree parse mechanism 306 in traversing a tree (either the program tree or the component objects tree) and locating nodes in the tree. Nodes in the tree that are located are provided to either an accessibility testing mechanism 318 or a component reference mechanism 316 depending on which of these two mechanism requested the tree traversal.

The testing indication mechanism 314 is in communication with the program interface 304 and the accessibility testing mechanism 318. Using nodes from the tree traversal supplied by the tree parse mechanism 306, the accessibility testing mechanism 318 test the accessibility of the component objects in the Java-based program 302. The accessibility testing mechanism 318 is in communication with an accessibility standard database 320 containing accessibility standards against which the component objects of the Java-based program 302 is compared. After testing is completed by the accessibility testing mechanism 318, any component objects that do not meet accessibility criteria as tested for by the accessibility testing mechanism 318 are indicated as being such by the test indication mechanism 314. Such an indication may include a visual indication that the component object did not meet the criteria.

The accessibility report mechanism 310 is also in communication with the accessibility testing mechanism 318. The accessibility report mechanism 310 presents a summary of the test results.

The component display mechanism 312 is in communication with the component reference mechanism 316 to display information on a particular component object in the Java-based program 302. The component reference mechanism 316 determined the objects in the program tree that are objects of the particular component class. The component display mechanism 312 displays the objects that are object of the particular component class as well as the referring class name, program tree, component objects tree and accessibility description.

It is apparent to one skilled in the art that numerous modifications and departures from the specific embodiments described herein may be made without departing from the spirit and scope of the invention.

The invention claimed is:

1. A data processing system implemented method of testing accessibility of a data processing system program according to accessibility criteria, the data processing system program comprising a plurality of objects, at least one object of the plurality of objects usable as a user interface between the data processing system program and a user, the data processing system implemented method comprising:

identifying the at least one object of the data processing system program pertaining to the user interface;

determining, using a processor, if the identified at least one object satisfies the accessibility criteria by examining an accessibility description for the identified at least one object; and outputting results of the determining.

2. The data processing system implemented method according to claim 1 wherein objects pertaining to the user interface are related and those relationships are represented in a tree structure having nodes representing each of the objects, wherein the identifying the at least one object comprises: locating the nodes of the tree structure to identify the objects pertaining to the user interface.

3. The data processing system implemented method according to claim 1 further comprising: displaying information about the at least one object pertaining to the user interface, including information obtained from the determining if the identified at least one object satisfies the accessibility criteria.

4. The data processing system implemented method according to claim 3 wherein objects pertaining to the user interface are related and those relationships are represented in a tree structure having nodes representing each of the objects, and wherein the displaying information comprises: obtaining at least one path from a root of the tree structure to a node representing the at least one object on which information is being displayed.

5. The data processing system implemented method according to claim 1 wherein the data processing system program is a Java based program.

6. The data processing system implemented method of claim 1 wherein the data processing system program includes an external interface, the external interface being operable for communication with an external data processing system providing accessibility functions for the data processing system program.

7. The data processing system implemented method of claim 6 wherein the at least one object also pertains to the external interface.

8. The data processing system implemented method according to claim 1, further comprising: producing an indication that the identified at least one object does not satisfy the accessibility criteria if the identified object does not contain an accessibility description.

9. The data processing system implemented method according to claim 1, wherein the outputting results of the determining comprises displaying whether the identified at least one object satisfies the accessibility criteria.

10. The data processing system implemented method according to claim 1, wherein said identifying comprises identifying, from a plurality of objects of the data processing system program, the at least one object that is a user interface object of the processing system program.

11. The data processing system implemented method according to claim 1, wherein said accessibility criteria relates to different types of user access provided in the data processing system program.

12. The data processing system implemented method according to claim 1, wherein said accessibility criteria comprises a check list with types of access for users with disabilities provided in the data processing system program.

13. The data processing system implemented method according to claim 1, wherein said accessibility criteria relates to types of disabled user access provided in JAVA based programs and wherein the data processing system program is a JAVA based program.

14. The data processing system implemented method according to claim 1, wherein contents of the data processing program are analyzed by the data processing system to identify the at least one object, wherein the contents comprises objects and wherein the identified at least one object serves as a user interface of the data processing system program, wherein the examining of the accessibility description of the identified at least one object comprises determining types of user accesses provided by the identified at least one object, and wherein accessibility criteria comprises identifiers of types of user interfaces for access to the data processing program by a disabled user.

15. A data processing system for testing accessibility of a data processing system program according to accessibility criteria, the data processing system program comprising a plurality of objects, at least one object of the plurality of objects usable as a user interface between the data processing system program and a user, the data processing system comprising:
an identifier that identifies the at least one object of the data processing system program pertaining to the user interface;
a determinator that determines, using a processor, if the identified at least one object satisfies the accessibility criteria by examining an accessibility description for the identified at least one object; and
an output module that outputs results of the determinator.

16. The data processing system according to claim 15 wherein objects pertaining to the user interface are related and those relationships are represented in a tree structure having nodes representing each of the objects, wherein the identifier for identifying the at least one object comprises a locator for locating the nodes of the tree structure to identify the objects pertaining to the user interface.

17. The data processing system according to claim 15 further comprising: a display for displaying information about the at least one object pertaining to the user interface, including information obtained from the determining if the identified at least one object satisfies the accessibility criteria.

18. The data processing system according to claim 17, wherein objects pertaining to the user interface are related and those relationships are represented in a tree structure having nodes representing each of the objects, and wherein the display for displaying information comprises an obtainer for obtaining at least one path from a root of the tree structure to a node representing the at least one object on which information is being displayed.

19. The data processing system according to claim 15 wherein the data processing system program is a Java based program.

20. The data processing system of claim 15 wherein the data processing system program includes an external interface, the external interface being operable for communication with an external data processing system providing accessibility functions for the data processing system program.

21. The data processing system of claim 20 wherein the at least one object also pertains to the external interface.

22. The data processing system according to claim 15, further comprising: a producer for producing an indication that the identified at least one object does not satisfy the accessibility criteria if the identified object does not contain an accessibility description.

23. A computer readable medium storing instructions for testing accessibility of a data processing system program according to accessibility criteria, the data processing system program comprising a plurality of objects, at least one object of the plurality of objects usable as a user interface between the data processing system program and a user, the instructions comprising:
identifying the at least one object of the data processing system program pertaining to the user interface;
determining if the identified at least one object satisfies the accessibility criteria by examining an accessibility description for the identified at least one object; and
outputting results of the determining.

24. The computer readable medium according to claim 23 wherein objects pertaining to the user interface are related and those relationships are represented in a tree structure having nodes representing each of the objects, wherein the data processing system executable code for identifying the at least one object comprises: data processing system executable code for locating the nodes of the tree structure to identify the objects pertaining to the user interface.

25. The computer readable medium according to claim 23 further comprising: data processing system executable code for displaying information about the at least one object pertaining to the user interface, including information obtained from the determining if the identified at least one object satisfies the accessibility criteria.

26. The computer readable medium according to claim 25 wherein objects pertaining to the user interface are related and those relationships are represented in a tree structure having nodes representing each of the objects, and wherein the data processing system executable code for displaying information comprises: data processing system executable code for obtaining at least one path from a root of the tree structure to a node representing the at least one object on which information is being displayed.

27. The computer readable medium according to claim 23 wherein the data processing system program is a Java based program.

28. The computer readable medium of claim 23 wherein the data processing system program includes an external interface, the external interface being operable for communication with an external data processing system providing accessibility functions for the data processing system program.

29. The computer readable medium of claim 28 wherein the at least one object also pertains to the external interface.

30. The computer readable medium according to claim 23, further comprising: data processing system executable code for producing an indication that the identified at least one object does not satisfy the accessibility criteria if the identified object does not contain an accessibility description.

\* \* \* \* \*